Figure 1:
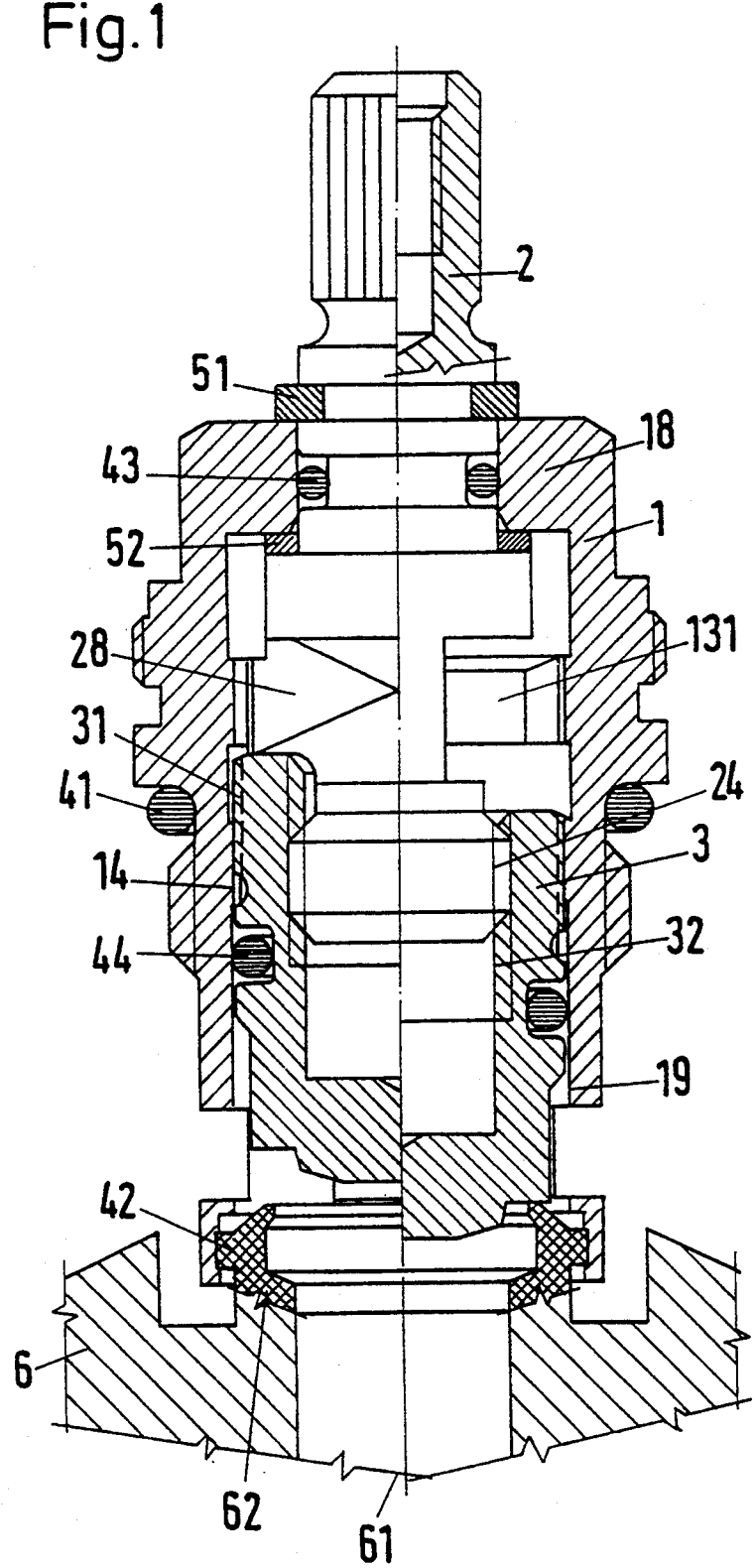

United States Patent [19]

Lange et al.

[11] Patent Number: 5,406,973
[45] Date of Patent: Apr. 18, 1995

[54] VALVE UPPER PART

[75] Inventors: Peter Lange; Helmut Ziebach, both of Luedenscheid, Germany

[73] Assignee: Fluehs Drehtechnik GmbH, Luedenscheid, Germany

[21] Appl. No.: 204,338

[22] PCT Filed: Jun. 5, 1993

[86] PCT No.: PCT/DE93/00488
§ 371 Date: Mar. 14, 1994
§ 102(e) Date: Mar. 14, 1994

[87] PCT Pub. No.: WO94/02763
PCT Pub. Date: Feb. 3, 1994

[30] Foreign Application Priority Data

Jul. 17, 1992 [DE] Germany .............. 42 23 589.8

[51] Int. Cl.$^6$ .............................................. F16K 1/02
[52] U.S. Cl. ........................ 137/454.5; 251/268; 251/288
[58] Field of Search ............... 137/454.5; 251/267, 251/268, 288

[56] References Cited

U.S. PATENT DOCUMENTS

| | | | |
|---|---|---|---|
| 3,082,786 | 3/1963 | McLean | 137/454.5 |
| 4,064,904 | 12/1977 | Tolnai | 137/454.5 |
| 4,138,091 | 2/1979 | McGee | 251/267 |
| 4,860,784 | 8/1989 | Petersen et al. | 251/267 X |
| 5,103,857 | 4/1992 | Kuhn et al. | 251/288 |

FOREIGN PATENT DOCUMENTS

| | | |
|---|---|---|
| 1827237 | 2/1963 | Germany . |
| 1295938 | 5/1969 | Germany . |
| 8524528.3 | 11/1985 | Germany . |
| 4025654A1 | 2/1992 | Germany . |
| 543023 | 11/1973 | Switzerland . |

*Primary Examiner*—Stephen M. Hepperle
*Attorney, Agent, or Firm*—Spencer, Frank & Schneider

[57] ABSTRACT

The valve upper part has a head piece (1), a spindle (2) and a valve piston (3). The valve piston (3) can move axially in the head piece (1). The spindle (2) can rotate in the head piece (1). Spindle (2) and valve piston (3) are connected together via a movement thread (24, 32). The movement of the valve piston (3) in the axial direction is limited by a stop arranged internally on the head piece (1) and arranged externally on the spindle (2) in the same cross-sectional plane. For axial location, the valve piston (3) and the head piece (1) each have a polyhedron (31; 14) which is formed by teeth which are triangular in cross-section and which interlink. When the valve piston (3) is closed the sealing is hydrostatic by means of a sealing ring (42) retained in the head piece (1).

7 Claims, 4 Drawing Sheets

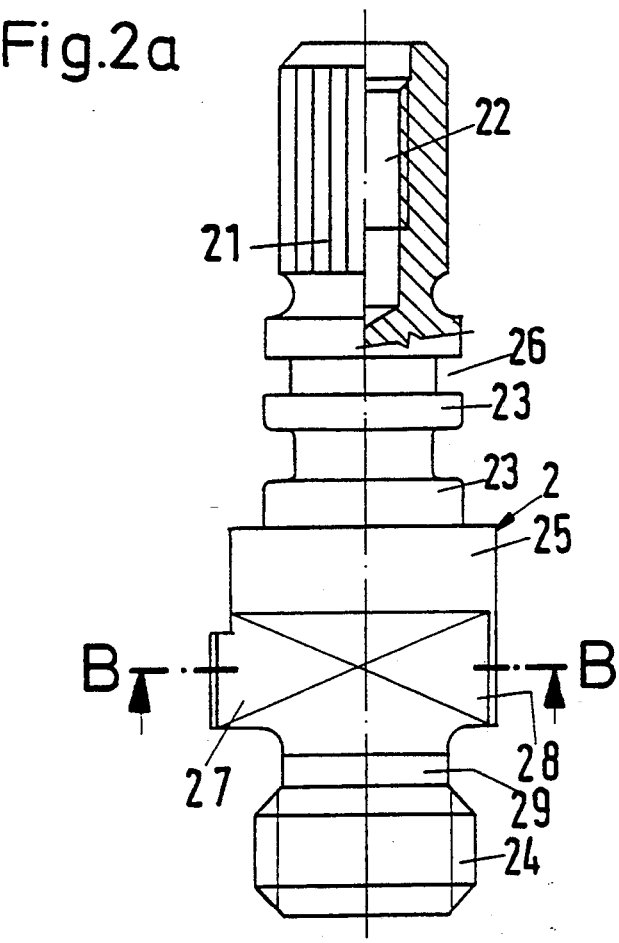
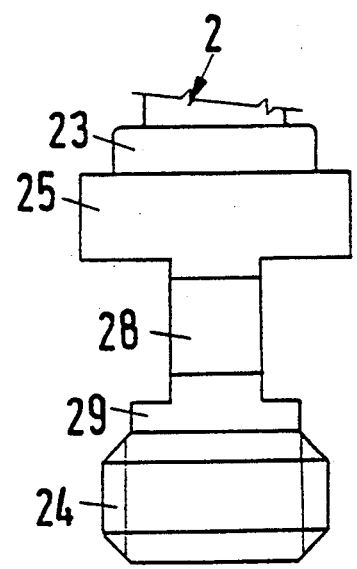
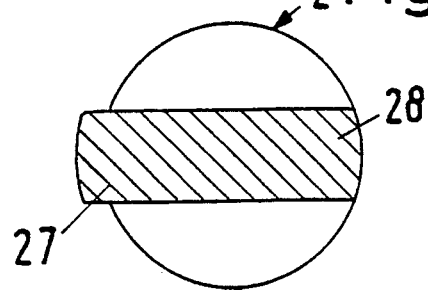

(A-A)

VALVE UPPER PART

The invention relates to a valve upper part for fittings, in which an axially movable valve piston and a rotary spindle which are connected together via a thread are placed in a head piece, in which interlinking polyhedra are provided on the valve piston and in the head piece for axial placement and a stop is provided to limit the axial movement and in which a sealing ring which projects beyond the front face of the head piece facing the inlet and is designed on the projecting outer front face as a surface for its rest position on a valve face of the fitting is retained by the head piece.

The discharge of water from sanitary fittings, for example, is controlled with the aid of valve upper parts. For this purpose the valve upper part is screwed into the housing of the sanitary fitting by means of its head piece; a rotary handle or a lever is placed on its spindle.

A valve upper part of the kind mentioned above is known (see US-PS 40 64 904). The known valve upper part has two opposing surfaces for placing the valve piston in the head piece. The axial movement of the valve piston is limited by means of a ring that is retained in the head piece, projects over the outer front face with a projection and projects into a rotary handle on which a projection pointing radially inwards is moulded. In the case of the known valve upper part, the approach point of the valve piston to the seal cannot be accurately fixed. A further drawback is the fact that the rotary handle is required in order to limit the axial movement; this means that only certain rotary handles can be used and thus limits the application of the valve upper part.

This is where the invention intends to provide assistance. The object of the invention is to design a valve upper part of the above-mentioned kind in such a way that the approach point of the valve piston to the seal, which can, moreover, be designed as a geometrically simple seal, e.g. with round or square cross-section, can be accurately fixed. This object is achieved according to the invention in that the axial movement of the valve piston is limited by a stop arranged internally in the head piece and externally on the spindle, in the same cross-sectional plane, and that the internal polyhedron of the head piece and the external polyhedron of the valve piston is formed by teeth which are designed as equilateral triangles in the front view.

The design of a polyhedron for guiding a valve cone in a valve chamber as a triangle in cross-section is essentially known (cf. DE-GM 18 27 237).

The internal polyhedron on the head piece and the external polyhedron on the valve piston which engages in this internal polyhedron are provided for axially guiding the valve piston so as to prevent distortion and for accurately fixing its approach point to the sealing ring which projects over the front face of the head piece facing the inlet. The axial movement of the valve piston in the direction of this front face and hence of a valve face of the fitting is limited by the stop which is formed by a stop surface on the spindle on the one hand and by a stop surface in the head piece on the other hand. The stop surfaces come to rest when the spindle is rotated in the direction of closure. The rest position is the closed position of the valve upper part. With a number m of teeth on the polyhedron and with a pitch n of the movement thread between valve piston and spindle, the accuracy with which the approach point of the valve piston to the seal can be fixed is the ratio m/n. In the opposite direction also, i.e. in the return stroke, the axial movement of the valve piston is limited by the stop, viz. by counter-stop surfaces in the spindle and the head piece. It is advantageous to select the stops in such a way that the angle of rotation of the spindle is approx. 270°. The angle of rotation of the spindle can then be set to any angle under 270° by means of a setting screw and a stop pin in the spindle.

Figure 3:
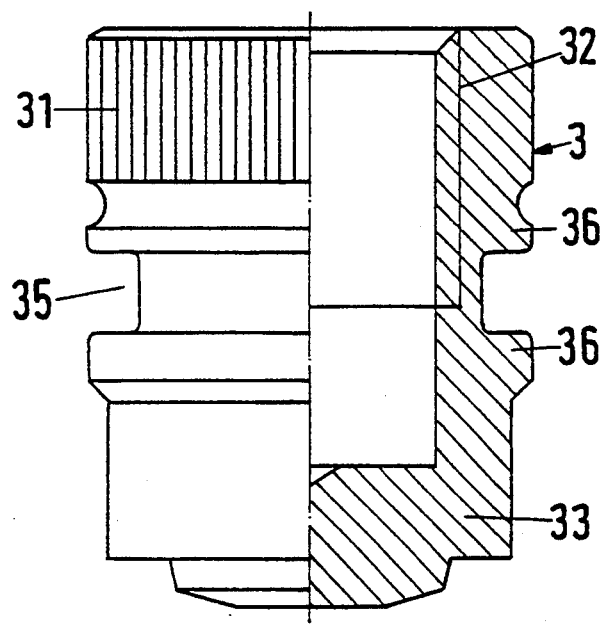
Figure 4C:
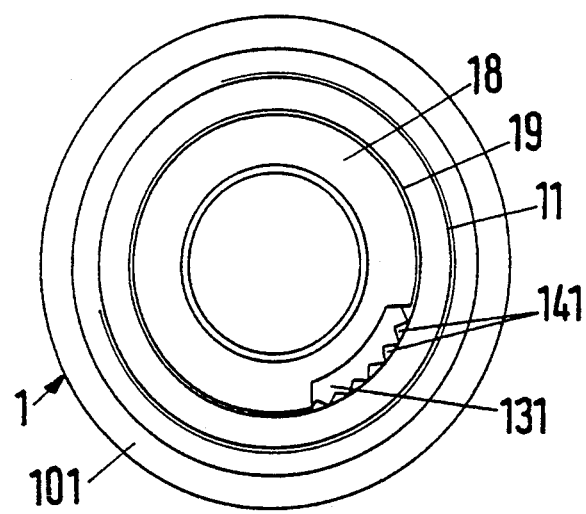
Figure 4B:
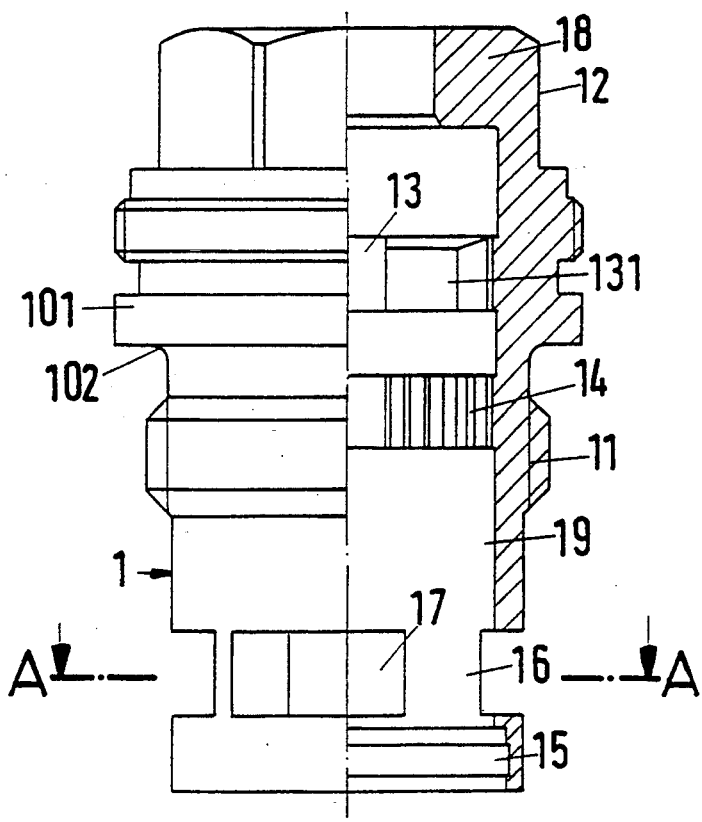
Figure 4A:
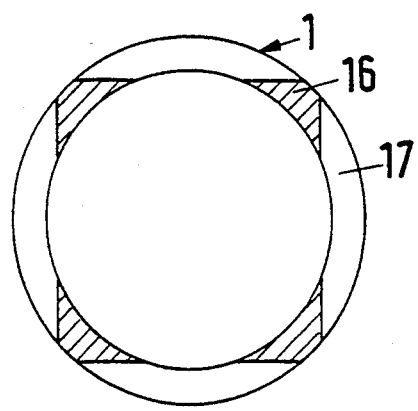

Embodiments and further developments of the invention are described in the sub-claims. An example of an embodiment of the invention is described in greater detail below and is shown in the drawing, in which:

FIG. 1 shows an enlarged longitudinal section of a valve upper part connected to a sanitary fitting, one half showing the valve upper part in the closed condition and the other half in the open condition, FIGS. 2a–2c shows the spindle of the valve upper part:
  2a) is a side view, partially in longitudinal section
  2b) is a horizontal section through B—B
  2c) is a side view rotated through 90° with respect to a), FIG. 3 shows the valve piston of the valve upper part, one half in longitudinal section, one half as a side view, FIGS. 4a–4c shows the head piece of the valve upper part:
  4a) is a section through A—A
  4b) shows one half in longitudinal section and the other half as a side view
  4c) shows a front view.

The valve upper part selected as an example of an embodiment essentially has three parts which are connected together and located with respect to each other, viz. a head piece 1, a spindle 2 passing centrally through the head piece 1 and located radially in it and a valve piston 3 screwed onto the spindle 2 and axially located in the head piece 1.

The head piece 1 comprises a symmetrical hollow body whose two front faces are open–see FIGS. 1 and 4a–4c. Approximately in the centre the head piece 1 has an external thread 11 with which it can be screwed into the housing of a sanitary fitting 6 shown only with a part of a water supply conduit. The head piece 1 is screwed into the sanitary fitting 6 by means of key surfaces 12 which are provided on the outside of the head piece 1 in the area of the external front face. In the area of this front face the head piece 1 is provided with a convergent edge 18 on which the spindle 2 is axially supported and radially located.

A hollow cylindrical part 19 adjoins the edge 18. At a distance from the edge 18 an internal ring 13, whose internal diameter is only slightly smaller than that of the hollow cylindrical part 19, is provided in the hollow cylindrical part 19. From the internal ring 13 a stop 131 shaped like part of a circle projects radially into the cavity of the head piece 1. The purpose of the stop 131 is to limit the rotary movement of the spindle 2 and hence—in a way still to be described—the axial movement of the valve piston 3. At a distance from the internal ring 13 and on the side facing away from the convergent edge 18, an internal polyhedron 14 is incorporated in the hollow cylindrical part 19. The internal polyhedron 14 is formed by a multiplicity of teeth 141 which are designed in the front view in the manner of equilateral triangles. If the teeth 141 were evenly distributed over the entire periphery of the hollow cylindrical part 19, 40 teeth 141 would be provided in the embodiment.

To simplify manufacture, however, the teeth 141 are distributed over one section only, preferably over a quarter of the periphery. The internal polyhedron 14 is provided for the axial location of the valve piston 3 to prevent distortion and for the accurate fixing of its approach point to a seal 42.

On the water inlet side and adjoining the polyhedron 14, the cylindrical surface 19 of the head piece is extended and in this part also it is used to locate and seal the valve piston 3 in respect of a movement thread still to be described. An internal annular groove 15 which receives the sealing ring 42 is set into this cylindrical surface 19 at a distance from the side facing away. This sealing ring 42 can have a circular, rectangular or lip-shaped cross-section, i.e. it can be a traditional sealing ring. On the side of the internal annular groove 15 facing away from the front face of the head piece 1, the head piece 1 has windows 17 for the water to pass through which are recessed in its wall and symmetrically distributed in the same transverse plane. Four windows 17 are provided in the embodiment. They are formed by four longitudinal ribs 16, each of which has an approximately trapezoidal cross-section which reduces towards the outside, with basic sides which are rounded and correspond to the internal and external diameter of the cylindrical wall of the head piece. On the outside and approximately equidistant between internal ring 13 and internal polyhedron 14 the head piece has an external flange 101 with which the head piece 1 rests on the housing of the sanitary fitting after being screwed in. On its side facing the external thread 11 the external flange 101 has an annular groove 102 to receive a sealing ring 41. This sealing ring 41 is arranged between the head piece 1 and the sanitary fitting 6 after the valve upper part has been screwed in. The spindle 2 is essentially designed to be solid—see FIGS. 1 and 2a–2c. Externally on its one front face it is designed as a polyhedron 21 and internally it is provided with a blind hole 22 with internal thread which form a receptacle for the fixing of a rotary handle or lever which is not shown. On the outside of the spindle 2 and at a distance from the receptacle is an annular surface 23 with which the spindle 2 is radially located on the edge 18 of the head piece 1. The annular surface 23 is interrupted by an annular groove which receives a sealing ring 43. Externally on the side opposite the polyhedron 21 the spindle 2 is provided with an external thread 24 representing a part of a movement thread 24, 32. Adjoining the annular surface 23, on the side facing the external thread 24 is a flange 25 which rests internally against the edge 18 of the head piece 1, with a sliding disk 51 being inserted, and absorbs the axial pressure that is generated when the spindle 2 is actuated. On the side facing the polyhedron 21 is a recess 26 which receives a retaining ring 52 which rests externally on the edge 18. The area between the flange 25 and the external thread 24 is designed in the manner of a rib 28. In the front view of the spindle 2 the rib 28 is designed to be eccentric. Radially its one end forms the extension of the flange 25. Its other end projects over the flange 25 and forms an external stop 27 which cooperates with the internal stop 131 in the head piece 1. The transition between the rib 28 and the external thread 24 is designed in the manner of a plate 29 of small diameter.

On its one front face—see FIGS. 1 and 3—the valve piston 3 has an external polyhedron 31 with which the valve piston 3 is axially located in the internal polyhedron 14 of the head piece 1 and an internal thread 32 representing the other part of the movement thread into which the external thread 24 of the spindle 2 is screwed. Like the internal polyhedron 14 of the head piece 1 the external polyhedron 31 is formed by a multiplicity of teeth, 40 teeth in the embodiment, which are designed in the front view as equilateral triangles. A rotation of the spindle 2 by means of the rotary handle which is not illustrated is converted into an axial movement of the valve piston 3 via the movement thread 24, 32 as well as the external polyhedron 31 and the internal polyhedron 14. When this axial movement takes place the front face of the valve piston 3 facing the water inlet is raised or lowered in relation to the sealing ring 42 which is retained in the internal annular groove 15 of the head piece 1 and rests against a valve face 62 provided in a water inlet 61 of the sanitary fitting 6. The seal is effected by means of the hydrostatic pressure. When this axial movement takes place the valve piston 3 is also guided by means of an external flange 36 moulded on adjacent to the external polyhedron 31 on the one hand and the cylindrical surface 19 in the head piece 1 on the other hand. An annular groove 35 is provided in the external flange 36 to receive a sealing ring 44. The sealing ring 44 causes the movement thread 24, 32 to lie in the sealed area. The grease required to operate the movement thread 24, 32 is not affected by the water.

The axial movement of the valve piston 3 in the direction of the valve face 62 is limited by the stop 27 on the rib 28 of the spindle 2 in cooperation with the stop 131 on the internal ring 13 of the head piece 1. The stops 27, 131 come to rest when the spindle 2 is rotated in the direction of closure. The rest position of the stops 27, 131 is the closure position of the valve upper part. Through the multiplicity of teeth of the external polyhedron 31, 40 teeth in the embodiment, and the pitch of the movement thread 24, 32, 2 mm in the embodiment, the approach point of the valve piston 3 to the seal 42 can be fixed with great accuracy. At a pitch m and a number of teeth n the accuracy $m/n$ in the embodiment $= 2$ mm$/40 = 0.05$ mm.

In the opposite direction—return stroke—also, the axial movement of the valve piston 3 is limited by the stop 27 on the rib 28 of the spindle 2 in cooperation with the stop 131 on the internal ring 13 of the head piece 1, in this case by the opposite stop surfaces compared with the stop surfaces for the closure movement. In the embodiment, the angle of rotation of the spindle 2 is set at 270° with the stop 131 designed approximately in the shape of a quarter of a circle. The return stroke of the valve piston 3 can be limited to below 270° by means of a setting screw and a stop pin in the spindle 2. It is then possible also to select the angle of rotation at 180° or 90°, for example, and thus additionally to limit the volume flow.

The front face of the valve piston 3 facing the valve face 62 is designed in the manner of an unperforated plate 33. The surface of the plate 33 facing the valve face 62 is designed without a sealing ring. At the edge the plate 33 has a chamfer round it. The chamfer is provided for reasons of flow technology: the noise generated when the valve opens and closes is minimized.

We claim:

1. Valve upper part for fittings, in which an axially movable valve piston (3) and a rotary spindle (2) which are connected together via a thread (32; 14) are placed in a head piece (1), in which interlinking polyhedra (31; 14) are provided on the valve piston (3) and in the head piece (1) for axial placement and a stop (27; 131) is provided to limit the axial movement and in which a sealing ring (42) which projects beyond the front face of the head piece (1) facing the inlet and is designed on the projecting outer front face as a surface for its rest position on a valve face (62) of the fitting (6) is retained by the head piece (1), characterized in that the axial movement of the valve piston (3) is limited by a stop (131; 27) arranged internally in the head piece (1) and externally on the spindle (2), in the same cross-sectional plane, and that the internal polyhedron (14) of the head piece (1) and the external polyhedron (31) of the valve piston (3) is formed by teeth which are designed as equilateral triangles in the front view.

2. Valve upper part according to claim 1, characterized in that at a distance from the external front face of the head piece (1) a stop (131) which is shaped like part of a circle and projects radially inwards is moulded on to its hollow cylindrical internal surface (19).

3. Valve upper part according to claim 2, characterized in that a rib (28), at least one end of which projects radially over the contour of the spindle (2) and forms the second stop (27) is moulded on to the spindle (2) in the plane of the stop (131) shaped like part of a circle.

4. Valve upper part according to claim 1, characterized in that the internal polyhedron (14) is incorporated in the hollow cylindrical internal surface (19) of the head piece (1) on the side of the stop (131) facing away from its external front face.

5. Valve upper part according to claim 4, characterized in that the internal polyhedron (14) is formed by teeth (141) which are incorporated over only a section, preferably over a quarter, of the periphery of the hollow cylindrical internal surface (19).

6. Valve upper part according to claim 1, characterized in that windows (17) symmetrically distributed in the same cross-sectional plane are recessed in the wall of the head piece (1) between the polyhedron (14) and the sealing ring (42).

7. Valve upper part according to claim 6, characterized in that each window (17) is limited by two longitudinal ribs (16) each one of which has an approximately trapezoidal cross-section which reduces towards the outside, with basic sides which are rounded and correspond to the internal and external diameter of the wall of the head piece (1).

* * * * *